Dec. 11, 1962          K. GLÜCK          3,067,838

ELECTRIC CLOCK MOVEMENT WITH A BATTERY-FED ELECTRIC MOTOR

Filed Sept. 9, 1960          3 Sheets—Sheet 1

INVENTOR
KURT GLÜCK

BY

ATTORNEY.

Dec. 11, 1962 K. GLÜCK 3,067,838
ELECTRIC CLOCK MOVEMENT WITH A BATTERY-FED ELECTRIC MOTOR
Filed Sept. 9, 1960 3 Sheets-Sheet 2

INVENTOR
KURT GLÜCK

BY
ATTORNEY.

Dec. 11, 1962 K. GLÜCK 3,067,838
ELECTRIC CLOCK MOVEMENT WITH A BATTERY-FED ELECTRIC MOTOR
Filed Sept. 9, 1960 3 Sheets-Sheet 3

INVENTOR
KURT GLÜCK
BY
ATTORNEY.

United States Patent Office

3,067,838
ELECTRIC CLOCK MOVEMENT WITH A BATTERY-FED ELECTRIC MOTOR
Kurt Glück, Kleinengstingen, Kreis Reutlingen, Germany, assignor to C. Diamond Co., Inc., New York, N.Y., a corporation of New York
Filed Sept. 9, 1960, Ser. No. 54,946
11 Claims. (Cl. 185—40)

The present invention relates to an electric clock movement with a battery-fed electric motor, in general, and to such electric clock movement having a generally pretensioned spring which operates the movement and which is periodically wound by means of a battery-fed electric motor controlled by means of a freely rotatable control member which is coupled alternately with a spring winding gear and a spring releasing gear, respectively, in particular.

In the known embodiments of such clock movement, the control member, which generally operates the electromotor by means of a switching lever, is moved ahead from its inoperative position, in which the motor current is interrupted, into its operative position by means of a driver or the like disposed on the spring releasing gear, the switching lever, when in its operative position, closing again the previously interrupted motor circuit. Shortly before the termination of the winding process, the control member is coupled with the spring winding gear and returned into its inoperative position, in which the switching lever interrupts again the motor circuit and causes the stopping of the motor. Since, however, depending upon the prevailing current of the battery driving the electric motor the retardation of the electric motor differs, upon interruption of the current, not only the spring winding gear, but also the control member driven by the spring winding gear in its inoperative position, advances for different lengths of its path during each winding period, before it assumes its always different inoperative position. This different inoperative position of the control member depending upon the prevailing current of the battery, is, however, insofar extremely disadvantageous, as in case of a comparatively strong battery current feeding the electric motor the control member, advances along relative greater lengths of its path during the winding process, must be advanced only for small angular ranges, in order to assume its operative position, while in case of a reduction of the battery current, an always greater advancement of the control member is required by means of the spring releasing gear which in turn causes a growing load of the spring operating the movement, during the likewise increased release time, which is extended to approximately 70 seconds. This force requirement, depending upon the prevailing current of the battery, lost for the drive of the movement and extending over increasing itme intervals has again an effect which is extremely disadvantageous for the operation and the control of the clock movement.

It is therefore, one object of the present invention to provide an electric clock movement with a battery-fed electric motor in which the difficulties set forth above are avoided.

It is another object of the present invention to provide an electric clock movement with a battery-fed electric motor wherein the control member is driven by means of the spring winding gear and preferably also by means of the spring releasing gear only for always limited, about equal angular ranges. A contact disk which preferably operates a switching lever of the motor can be used as control member, which contact disk projects only partly in operative connection into the swinging range of the spring winding gear and/or the spring releasing gear. Since the control member is thereby moved ahead for a constant length of its path, independently from the length of the path of the spring winding gear determined by the strength of the battery current, an always constant force is required for the advancement which force operates over always equal releasing time periods and which branches off from the spring, an expedient which amounts to a constant influence upon the operation of the movement and which causes a better control of the latter.

It is yet another object of the present invention to provide an electric clock movement with a battery-fed electric motor wherein the contact disk, as well as the spring winding gear and the spring releasing gear are equipped with drivers engaging the contact disk with said gears always only over limited and about constant angular ranges.

If lugs or the like or recesses are provided at the edge of the contact disk which determine the inoperative position of the spring-biased switching lever, the lugs or the like or the recesses project in the inoperative position of the contact disk advantageously only slightly, for instance, for 5° to 20°, in a direction opposite the rotating direction beyond the engaging point of the switching lever with the contact disk. By this particular arrangement, it is merely necessary to advance the contact disk over only a comparatively short path by the spring driving gear, in order to shift the same from its inoperative position to its operative position, which arrangement amounts again only to a very small force requirement which is lost for the movement and, thereby, an influence on the operation over a relatively small releasing time period of about 5 to 30 seconds.

It is still a further object of the present invention to provide an electric clock movement with a battery-fed electric motor, wherein the contact disk is equipped with three lugs spaced apart for an angle of 120° relative to each other, which lugs retain the switching lever in its inoperative position and extend over a range of about 50° each. In this case, the contact disk has advantageously on one of its sides three drivers again spaced apart for 120° relative to each other and cooperating with a driver of the spring winding gear, and at the other of its sides three further drivers, likewise spaced apart from each other for an angle of 120° and cooperating with the driver of the spring releasing gear, whereby, seen in the direction of rotation of the contact disk, the drivers of the contact disc coordinated to the spring driving gear, are disposed for about 20° to 25° ahead and the drivers of the contact disc coordinated to the spring releasing gear for about 30° to 35° behind the switching edges of the lugs which release the switching lever.

In order to avoid a complete release of the spring in case of inoperativeness of the spring winding, the free end of the switching lever disposed adjacent the contact disk extends in its operative position advantageously into the swinging range of the driver turning with the spring releasing gear and saves the further rotation of the spring releasing gear, if afterwards no or only an insufficient spring winding takes place.

It is yet a further object of the present invention to provide an electric clock movement with a battery-fed electric motor, wherein a spring cooperating with the spring winding gear operates in the inoperative position of the electric motor over the spring winding gear, and, preferably, over an intermediate drive in such manner in a direction opposite to that of the rotation of the motor shaft during the spring winding, that the rotor which is swingable in this counter-direction as a limit only for a few degrees, for instance 2° to 10°, assumes an adjusted inoperative position opposite the pole-shoes of the stator. This inoperative adjusted position of the rotor caused by the effect of the spring, is insofar of particular advantage, as with each renewed start of the electric motor, the rotor is additionally caused to rotate by means of the magnetic pulling force of the stator working on the rotor. By this arrangement, an extremely weaker current is required for starting the electric motor, whereby either the life of the battery feeding the electric motor is doubled, or with equal life of the battery the winding of two or more springs winding different clock movements is possible from one electric motor over a joint gear drive.

In order to limit the swinging range of the motor in the counter-direction, the air spaces between the pole-shoes of the stator and the rotor are measured in such manner, that the forces of magnetic attraction of the stator magnets retain the rotor in an inoperative position adjusted relative to the stator magnets and cause an equalization of the rotary moment exerted upon the rotor by the spring force. A further possibility is finally also presented by the feature that the swinging range of the rotor is limited by a locking device or the like.

With these and other objects in view, which will become apparent in the following detailed description, the present invention will be clearly understood in connection with the accompanying drawings, in which.

Figure 1:
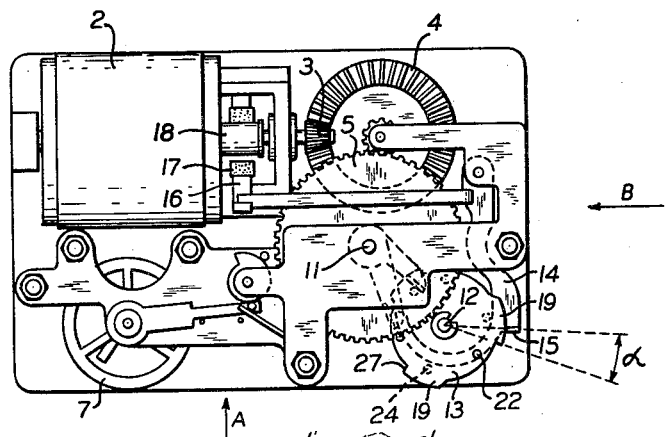
FIGURE 1 is a rear elevation of the clock movement.
Figure 2:
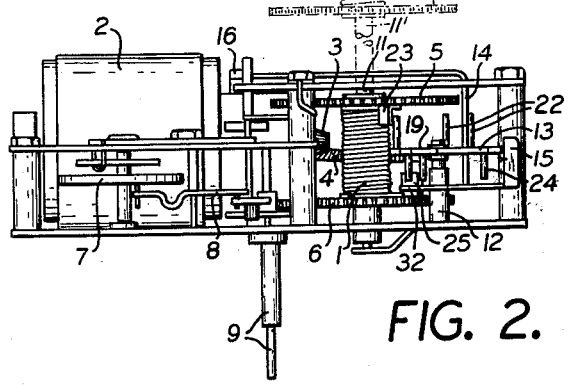
FIG. 2 is a bottom plan view of the clock movement, seen in the direction of the arrow A of FIG. 1.
Figure 3:
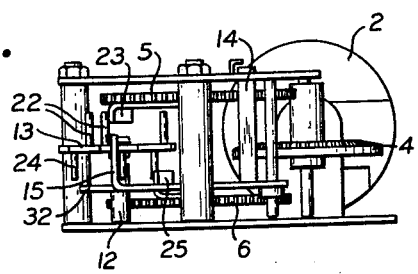
FIG. 3 is an end view of the clock movement, seen in the direction of the arrow B of FIG. 1.
Figure 10:
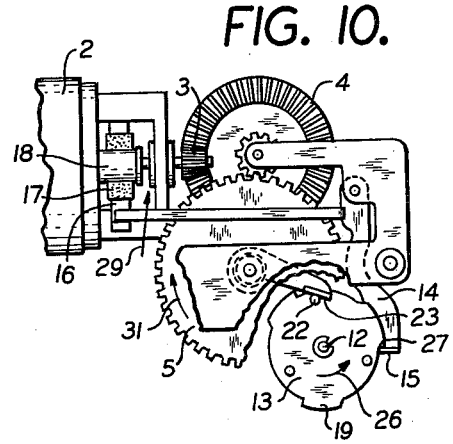
FIGS. 4 to 10 are fragmentary views of the switching mechanism at an enlarged scale, FIGS. 4, 6, 8 and 10 showing the upper portion, and FIGS. 5, 7 and 9 the low portion of the switching mechanism.

Referring now to the drawings, and in particular to FIGS. 1 to 3, the clock movement comprises a cylindrical helical spring 1 which is pretensioned, by example, for about five windings. The spring 1 is wound for one winding by means of the electric motor 2 fed by a battery (not shown) over an intermediate gear drive 3, 4 and a spring winding gear 5 upon each revolution of a spring releasing gear 6. The thus stored spring force is transmitted, thereby, over the spring releasing gear 6 to the clock movement having a balance wheel 7, the armature 8, and the shafts 9 carrying the hands (not shown).

The spring winding gear 5 and the spring releasing gear 6 are mounted on a common axle 11 and a cam disk 13, which is freely rotatable upon the pin 12 and disposed laterally to the axle 11, serves the control of the electric motor 2. A switching lever 14 having an edge formation 15 engages the outer periphery of the cam disk 13 and the latter causes alternately a lifting of and engagement with a commutator 18 of the electric motor 2 of a brush 17. The cam disk 13 is equipped with three lugs 19 spaced apart for an angle of 120° relative to each other and retaining the switching lever 14 in its inoperative position, the lugs extending for an angular range of 50° and, as particularly indicated in FIG. 4 of the drawings, in the inoperative position of the cam disk 13 in a direction opposite to that of the direction of rotation for an angle α of about 10° beyond the engaging point 21 of the edge 15 of the switching lever 14 towards the opposite lug 19. Furthermore, three contact pins 22 are provided on the upper face of the cam disk 13, which contact pins 22 are spaced apart for about 120° relative to each other and cooperate with the driver 23 disposed on the bottom face of the spring winding gear 5 and rotating with the latter. The cam disk 13 has additionally at its bottom face three further contact pins 24 which are again spaced apart for an angle of 120° relative to each other. The contact pins 24 are coordinated to the driver 25 disposed on the upper face of the spring driving gear 6 and rotating with the latter.

Figure 6:
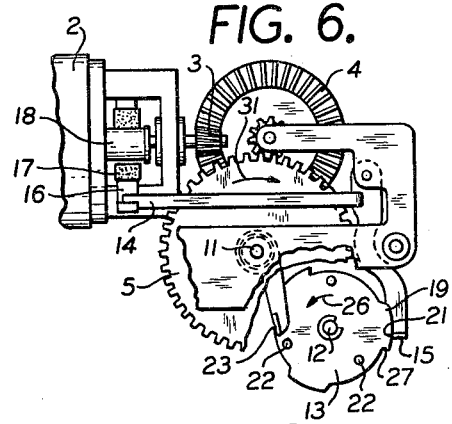

Looking in the direction of the arrow 26 (FIGS. 4, 6 and 8) which indicates the direction of advancement of the cam disk 13, the lower contact pins 24, which are coordinated to the driver 25 of the spring releasing gear 6, are disposed about 22° ahead and the upper contact pins 22, which are coordinated to the driver 23 of the spring winding gear 5, are disposed about 32° behind the edges 27 of the lugs 19, the edges 27 releasing the lever 14.

Figure 4:
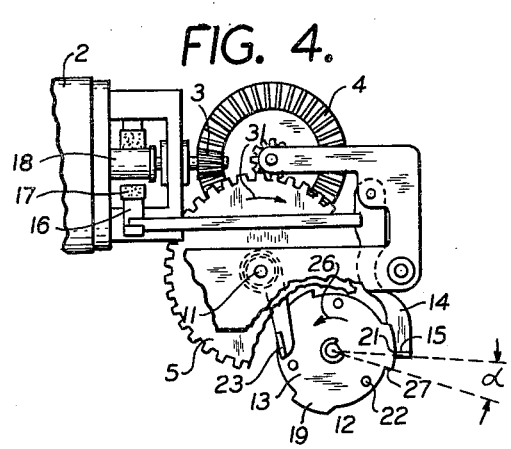
Figure 5:
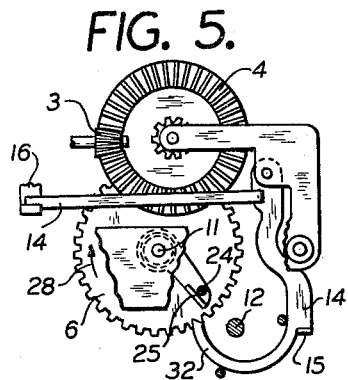

The operation of the clock movement during the winding process is as follows:

FIGS. 4 and 5 indicate the positions of the spring winding gear 5, of the spring releasing gear 6 and of the cam disk 13 immediately upon termination of the winding of the helical spring 1, the switching lever 14 having just lifted the brush 17 from the commutator 18 of the electric motor 2 and engages with its edge 15 and the point 21 of the oppositely disposed lug 19 of the cam disk 13.

Figure 7:
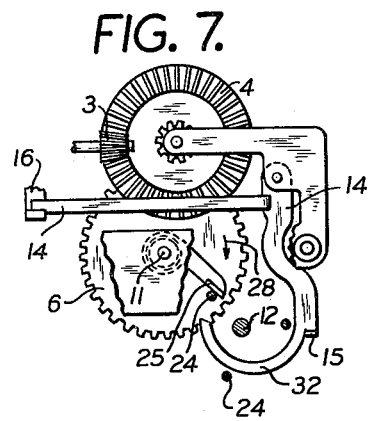

While the spring winding gear 5 retains this position, the spring releasing gear 6 rotates then so far in the direction of the arrow 28 (FIGS. 5 and 7) within about 8 minutes, due to the force of the helical spring 1, until its driver 25 reaches a position directly in front of the lower contact pin 24 extending into its swinging range, a position shown particularly in FIG. 7. During the continued rotation of the spring releasing gear 6, its driver 25 causes an advancement of the cam disk 13 in the direction of the arrow 26 (FIGS. 4, 6 and 8) for an angle α which operation requires a time period of about 20 seconds.

Figure 8:
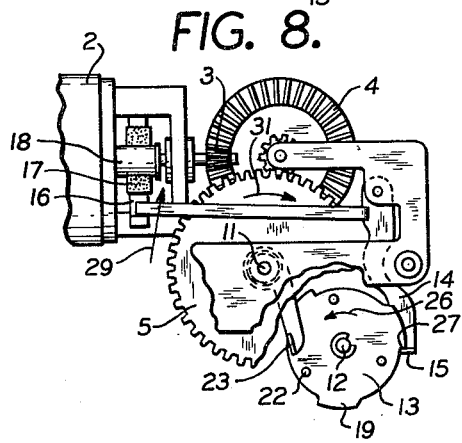
Figure 9:
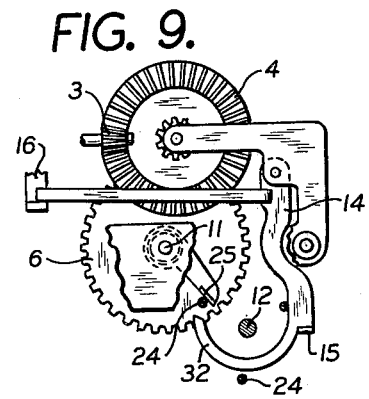

If the cam disk 13 is advanced for this angle α, the switching lever 14 slides with its edge 15 over the edge 27 of the adjacent lug 19 and performs a swinging movement in the direction of the arrow 29 (FIG. 8) due to the effect of the spring 16, whereby the brush 17 engages the commutator 18 as is clearly apparent from FIGS. 8 and 9. Since due to the engagement of the brush 17 with the commutator 18, the circuit to the electric motor 2 is closed, the latter starts its movement and drives the spring winding gear 5 in the direction of the arrow 31 (FIGS. 4, 6 and 8) over the beveled gear drive 3, 4, so that the spring winding gear 5 performs jointly with its driver 23 one revolution. Prior to termination of this one revolution, however, the driver 23 moves the cam disk 13 again into the inoperative position, shown in FIGS. 1 and 2, which driver 23 abuts the upper contact pin 22 extending into the range of the spring winding gear 5. During this operation, however, the edge 15 of the switching lever 14 is pushed aside again, so that the switching lever 14 performs a swinging movement opposite to that of the direction of the arrow 29, and, thereby lift the brush 17 from the commutator 18. While the spring winding gear 5 continues slightly its rotation jointly with its driver 23, due to the retardation of the rotor of the electric motor 2, the swinging range of the cam disk 13 is solely determined by the range, which is constant in any case, of engagement between the driver 23 and the upper contact pin 22 just engaging the same. Thus, however, the cam disk 13 assumes upon each winding always the same inoperative position, shown in FIGS. 4 and 5, whereby it is achieved that the driver 25 of the spring releasing gear 6 must advance the cam disk 13 always only for the constant comparatively small angle α. By this arrangement, it is again assured that the force required for the advancement of the cam disk 13 for the angle α, which force is lost for the clock movement and supplied by the helical spring 1, and also the releasing time period are approximately completely constant.

Figure 11:
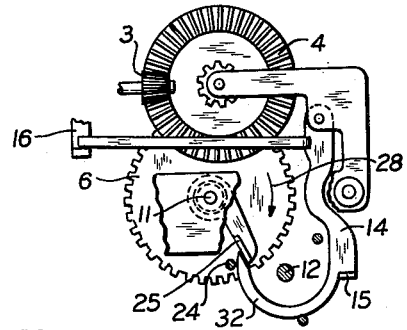
FIG. 11 is a fragmentary plan view of the switching lever indicating its locking position.

If due to weakening of the battery feeding the electric motor 2 the winding process is performed partly only or not at all, the advancement of the cam disk 13 into its inoperative position, shown in FIG. 4 ceases, and, thereby, also the lifting of the edge 15 of the switching lever 14 in a direction opposite to that of the arrow 29. In view of the further operative position of the switching lever 14, its bow-shaped free end 32 extends, however, into the swinging range of the driver 25 disposed on the upper face of the spring releasing gear 6, as shown in FIG. 11, and prevents a further rotation of the spring releasing gear 6 and, thereby, also a further release of the helical spring 1. By this arrangement, it is also assured that the helical spring 1 retains its pretension, even upon a miss of the periodic winding and, upon restoring of the periodic winding in the usual manner, can continue again its operation again under pretension.

It can be ascertained from the description set forth above, that the tensioned helical spring 1 operates the clock movement, on the one hand, over the spring releasing gear 6, and on the other hand, is in operative connection over the spring winding gear 5, the beveled gear drive 3 and 4 and the electric motor 2. If the gear drive 3 and 4, serving the transmission of the rotary moment produced by the electric motor 2, has none or a very low self-restrain, the reaction force of the helical spring 1 exerts a rotary moment on the shaft of the electric motor 2 in its inoperative position, the direction 33 of which is opposite to that of the normal rotation of the motor shaft, as indicated by the arrow 34 is FIGS. 13 and 14, during the winding of the spring 1.

Figures 12, 13, 14:
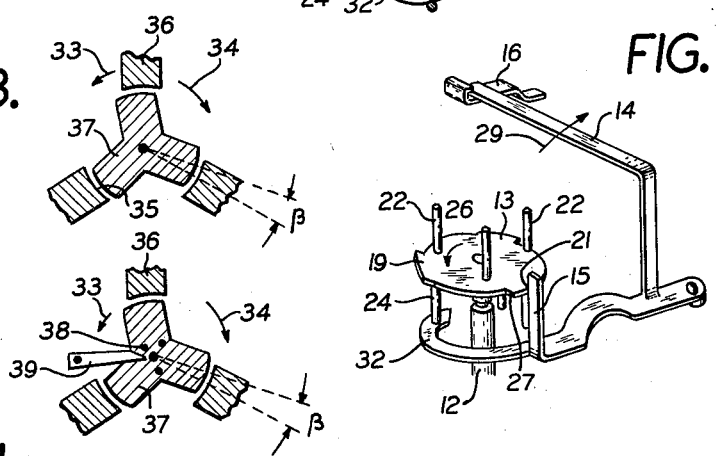
FIG. 12 is a perspective front view of the cam disk with the switching lever.
FIGS. 13 and 14 are schematic showings of two embodiments of the motor with the rotor disposed in its inoperative position.

If further the air spaces or air slots 35 between the pole-shoes 36 of the stator (not shown) and the rotor 37 is measured in such a manner, that the rotor 37 can follow the rotary moment exerted by the helical spring 1 in the opposite direction indicated by the arrow 33, the rotor 37 assumes an inoperative position, shown schematically in FIG. 13, relative to the pole-shoes 36, which is set off for an angle β, for instance 10°, in which inoperative position the permanent forces of magnetic attraction of the stator magnets just equalize exactly the rotary moment of the helical spring 1. This inoperative position of the rotor 37, set off for the angle β, brings about the particular advantage, that upon a new start of the electric motor 2 an appreciably lower starting current is required. By this arrangement it is possible, for instance, to wind with one electric motor 2 over the same gear drive 3 and 4 in addition to the helical spring 1, still another helical spring 1' forming part of a second movement which is connected with the first movement by an additional shaft 11' carrying the second helical spring 1', as well as the spring releasing gear 6', without, thereby, appreciably reducing the life of the battery.

A further possibility to limit the swinging range β of the rotor 37 in the opposite direction indicated by the arrow 33, is given by an arrangement, according to which a pawl 39, cooperating with pins 38 of the rotor 37, is provided, as schematically shown in FIG. 14.

While I have disclosed several embodiments of the present invention, it is to be understood that these embodiments are given by example only and not in a limiting sense, the scope of the present invention being determined by the objects and the claims.

I claim:

1. An electric clock movement comprising a battery-fed electric motor, a gear drive, a spring driving said movement, said electric motor performing periodically a plurality of windings of said spring within a time unit, a cam disk, a spring-biased switching lever, said cam disk controlling said electric motor by means of said switching lever, a spring winding gear and a spring releasing gear, an axle, said spring winding gear and said spring releasing gear being rotatably mounted on said axle, said spring winding gear and said spring releasing gear including driver means for alternately driving said cam disk by said spring winding gear and said spring releasing gear, respectively, and said cam disk extending partly only into the turning range of said spring winding gear and of said spring releasing gear, respectively.

2. The electirc clock movement, as set forth in claim 1, wherein said cam disk has a plurality of lever engaging elements along its periphery, said elements determining the inoperative position of said spring-biased switching lever, and extending in the inoperative position of said cam disk for about 5° to 20° in a direction opposite that of the direction of rotation beyond the engaging point of said switching lever with said cam disk.

3. The electric clock movement, as set forth in claim 2, wherein said lever engaging elements comprise lugs.

4. The electric clock movement, as set forth in claim 2, wherein said contact disk has three of said lever engaging elements spaced apart for 120°, and retains said switching lever in its inoperative position, and each of said lever engaging elements extending over a range of about 50°.

5. The electric clock movement, as set forth in claim 2, wherein said cam disk has on one side thereof three first driver means spaced apart for 120° from each other and cooperating with said driver means of said spring winding gear, and on the other side thereof three second driver means spaced apart for 120° from each other and cooperating with said driver means of said spring releasing gear, and said driver means coordinated to said spring releasing gear being disposed about 20° to 25° ahead, the operative edges of said lever engaging elements releasing said switching lever seen in the direction of rotation of said cam disk, and said driver means coordinated to said spring winding gear being disposed about 30° to 35° behind the operative edges of said lever engaging elements releasing said switching lever.

6. The electric clock movement, as set forth in claim 1, wherein one end of said spring is connected with said spring winding gear, and said electric motor has a motor shaft and comprises a rotor and a stator including pole-shoes, said spring turning said motor shaft in the inoperative position of said electric motor over said spring winding gear and said gear drive in the counter direction to that of the direction of rotation of said motor shaft, so that said rotor, swingable in a limited manner in said counter direction for an angle of a few degrees, assumes a set-off inoperative position relative to said pole-shoes of said stator.

7. The electric clock movement, as set forth in claim 6 wherein said pole-shoes of said stator and said rotor define air spaces, and said air spaces are measured so that the forces of permanent magnetic attraction of the stator magnets retain said rotor in an inoperative position rendered during the spring winding for 2° to 10° in a direction opposite its direction of rotation and cause a balancing of the rotary moment exerted upon said rotor by the force of said spring.

8. The electric clock movement, as set forth in claim 7, which includes a locking means for limiting the swinging range of said rotor in the opposite direction of rotation.

9. The electric clock movement, as set forth in claim 1, wherein said driver means comprises contact pins and drivers, respectively, said contact pins and said drivers engaging each other, and said cam disk, as well as said spring winding gear and said spring releasing gear having said driver means engaging within limited, substantially constant angular ranges.

10. The electric clock movement, as set forth in claim 1, wherein said switching lever has a free end, and the latter in the operative position of said switching lever extending within the turning path of said driver means coordinated to and rotating with said spring releasing gear.

11. The electric clock movement, as set forth in claim 1, which includes a plurality of springs adapted to operate a plurality of clock movements, and said electric motor and said gear drive winding said plurality of springs.

References Cited in the file of this patent

UNITED STATES PATENTS 2,051,455    Muir _____ Aug. 18, 1936

FOREIGN PATENTS 469,698    Great Britain _____ July 30, 1937